Dec. 8, 1970    J. T. BRUEGGEMAN    3,545,049
MANUALLY RELEASABLE CONNECTOR
Filed Sept. 10, 1968

INVENTOR.
John T. Brueggeman
BY Parker, Carter & Markey
Attorneys.

United States Patent Office 3,545,049
Patented Dec. 8, 1970

3,545,049
MANUALLY RELEASABLE CONNECTOR
John T. Brueggeman, 956 Deerfield Road,
Deerfield, Ill. 60015
Filed Sept. 10, 1968, Ser. No. 758,775
Int. Cl. A44b 13/02
U.S. Cl. 24—236                                    6 Claims

ABSTRACT OF THE DISCLOSURE

A connector including two generally semi-circular hooks biased together to define a holding loop, adapted to be separated to release anything held by the loop, with a tension member adapted to assist in holding the hooks together, the hooks being manually separable for release.

SUMMARY OF THE INVENTION

The two joined legs of the connector are biased outwardly at their free ends; each carries a recurved hook element extending across the free end of the other leg, the free ends of the hook elements overlap, to define a holding loop. Stops limit the outward movement of the free ends of the legs. The overlapping ends of the hooks are tangent to the loop when the stops are in engagement. Cam means adjacent the joined ends of the legs urge the legs against the stops when the connector is under tension. Manual pressure applied to the legs adjacent the hook members bring them together to separate the hook elements and open the holding loop to permit free escape from the loop. Because the overlapping hook ends are tangent to the loop and therefore perpendicular to the line of tension of the connector, the only resistance resulting from the loop on the connector is the friction of the load against the overlapping ends of the hook element.

BRIEF DESCRIPTION OF THE DRAWINGS

The invention is illustrated, more or less diagrammatically, in the accompanying drawings, wherein.

Like parts are indicated by like characters throughout the specification and drawings.

DESCRIPTION OF THE PREFERRED EMBODIMENTS

Figure 1:
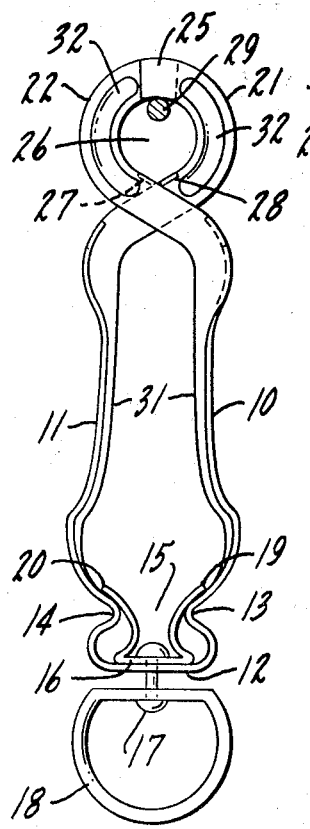
FIG. 1 is a plan view of the connector in closed position under tension.
Figure 2:
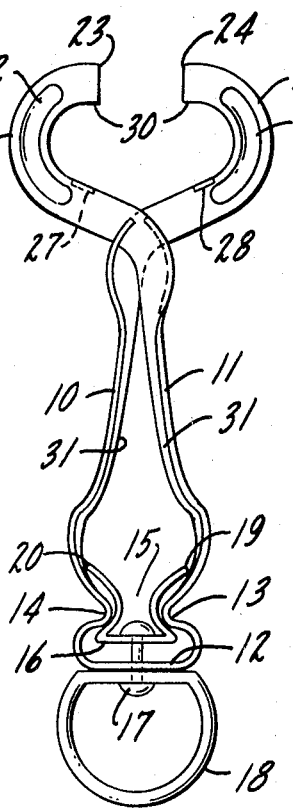
FIG. 2 is a similar plan view with the connector open.
Figure 3:
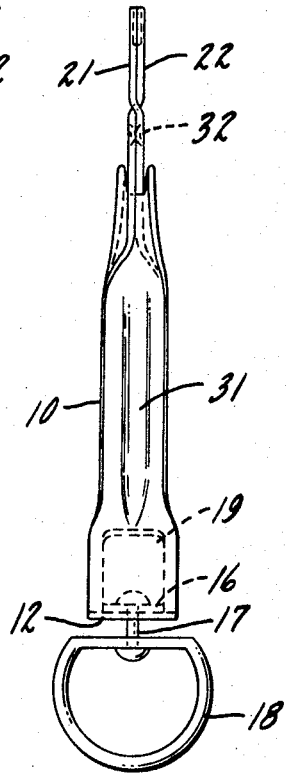
FIG. 3 is a side elevation of FIG. 1 in closed position.

The spring legs 10 and 11 are joined at their free ends by a cross member 12 which, with opposed humps 13 and 14 on the legs near the cross member 12, define a cam pocket 15. A cam plate 16 in the pocket overlies the cross member 12 and both are perforate to receive the headed pull pin 17 which, at its outer end, passes through the ring or shackle 18. When tension is applied to the shackle, the cam plate 16 is drawn down toward the cross member 12 and the cam arms 19 and 20 engage the humps 13 and 14 to urge the legs apart.

Each leg is channeled and from one side of each channel projects recurved hooks 21 and 22, each hook extending back over the free end of the other leg. The outer ends of the hooks 23 and 24 overlap at 25 to close a holding loop 26. Stops 27 and 28 limit the outward movement of the legs under the biasing effect of the legs and of the cam. When pressure is applied to the legs 10 and 11 forcing them inwardly, away from the stops, the loop opens to release anything held by or in it. The position of an element being held by the hook is illustrated diagrammatically at 29. The hook edges 30, where engaged by the element 29, are perpendicular to the axis of the connector. Thus the hook is not, so far as the hook member itself is concerned, self-locking. When the operator presses the legs 10 and 11 together, the overlapping hook elements 23 and 24 separate freely, the only resistance being friction. The hook elements are held locked together to keep the holding loop closed as a result of the bias of the legs and further as a result of the cam effect which is only present when the connector is under tension, but the bias and the cam effect can easily be overcome upon the pressure of the operator applied to the arms at their free ends.

Preferably, the connector is made of a thin sheet of material, reinforced by corrugations 31 in the arms and corrugations 32 in the hooks.

The sheet of material forming the two legs is folded at the free end of each leg to define opposed channels open toward one another. Each hook extends from one of the channel-defining folds on one leg into and through the channel on the other leg, being thereafter recurved to engage the outer end of the other hook. The hooks are in slidable contact at their inner ends and each hook is laterally displaced toward and across the other, intermediate their ends, to permit their outer ends to contact and overlap on the sides opposite to the sides in contact at their inner ends.

I claim:
1. A connector, applicable for use as a snap hook for training or controlling dogs, horses and the like, including
   two legs connected at their ends for relative angular movement, said legs having free ends that are biased apart,
   stop means integrally formed in each of said legs for limiting said movement,
   a recurved hook extending from each of said free ends to define, at the point of maximum outward leg movement, a generally circular holding loop, with the end portions of each of said free ends overlapping,
   a bias reinforcing means adapted to contact each of said legs and urge them apart, thereby urging said free ends together, responsive to tension being placed upon the connector.

2. The device of claim 1 characterized by the fact that each leg is folded together at its ends to form channels open toward one another and that each recurved hook extends from one wall of the channel and slidably penetrates the channel on the other leg, the hooks being in slidable engagement at their inner and outer ends only.

3. The device of claim 1 characterized by the fact that the outer end of each hook contacts the side of the other, hook on the side opposite to the side contacted, at the inner ends.

4. The device of claim 1 characterized by the fact that the legs are integral, made of a thin sheet of flexible material, which material is stiffened by corrugation both in the legs and in the hooks.

5. The structure of claim 1 further characterized in that the bias reinforcing means includes a cam plate between said legs, humps on said legs in opposition to the cam plate and a tension member adapted to urge said cam plate into contact with the humps.

6. The structure of claim 5 further characterized in that said legs are flexible so that manual pressure on said legs can overcome the biasing and tension effect to release the hook, said legs being forced together to separate said hooks, thereby opening said holding loop.

References Cited

UNITED STATES PATENTS

| | | | |
|---|---|---|---|
| 266,421 | 10/1882 | Blake | 24—237 |
| 1,499,738 | 7/1924 | King | 24—73CH |
| 1,648,016 | 11/1927 | Freysinger | 24—237 |
| 2,234,853 | 3/1941 | Breveggeman | 24—73CHX |
| 2,254,798 | 9/1941 | Dye | 24—259FCUX |
| 2,810,176 | 10/1957 | Gaafar | 24—237 |

FOREIGN PATENTS

| | | | |
|---|---|---|---|
| 825,652 | 12/1937 | France | 24—237 |

DONALD A. GRIFFIN, Primary Examiner

U.S. Cl. X.R.

24—73